(12) United States Patent
Burkert

(10) Patent No.: US 11,908,989 B2
(45) Date of Patent: Feb. 20, 2024

(54) METHOD AND DEVICE FOR PRODUCING A PRISMATIC BATTERY CELL CONTAINER

(71) Applicant: SCHULER PRESSEN GMBH, Goeppingen (DE)

(72) Inventor: Bruno Burkert, Bonn (DE)

(73) Assignee: SCHULER PRESSEN GMBH, Goeppingen (DE)

( * ) Notice: Subject to any disclaimer, the term of this patent is extended or adjusted under 35 U.S.C. 154(b) by 1335 days.

(21) Appl. No.: 16/396,122

(22) Filed: Apr. 26, 2019

(65) Prior Publication Data

US 2019/0252647 A1    Aug. 15, 2019

Related U.S. Application Data

(63) Continuation-in-part of application No. PCT/EP2017/077723, filed on Oct. 30, 2017.

(30) Foreign Application Priority Data

Nov. 4, 2016 (DE) ............... 10 2016 121 089.7

(51) Int. Cl.
*H01M 10/04* (2006.01)
*B21C 23/18* (2006.01)
(Continued)

(52) U.S. Cl.
CPC ........... *H01M 10/04* (2013.01); *B21C 1/26* (2013.01); *B21C 23/186* (2013.01);
(Continued)

(58) Field of Classification Search
CPC .. H01M 10/04; H01M 50/103; H01M 50/133; H01M 50/119; B21C 1/26;
(Continued)

(56) References Cited

U.S. PATENT DOCUMENTS

| 2,805,466 A | 9/1957 | Lyon |
| 6,333,124 B1 | 12/2001 | Moriwaki et al. |
| 2017/0117507 A1 | 4/2017 | Kong |

FOREIGN PATENT DOCUMENTS

| CN | 104 785 563 A | 7/2015 |
| CN | 106607532 A | 5/2017 |

(Continued)

OTHER PUBLICATIONS

Machine generated English translation of a Notice of a Preliminary Rejection issued by the Korean Patent Office dated Feb. 9, 2021, for the corresponding Korean patent application No. KR 10-2019-7015640.

(Continued)

*Primary Examiner* — Helen Oi K Conley
(74) *Attorney, Agent, or Firm* — Ronald S. Lombard

(57) ABSTRACT

The invention refers to a method and an apparatus (20) for manufacturing of a prismatic unilaterally open battery cell container (21). First an extruded container (41) is formed from a slug (38) by extrusion. The slug (38) consists of a uniform material. The extruded container (41) is then formed by a first ironing in a first ironing station (25) and by a second ironing in a second ironing station (28). During ironing the container is moved by a respective ironing ram (26, 29) only partly through an associated die tool (27, 30) and is reversed when reaching a reversal point (U). After the second ironing a remaining edge (82) of the obtained intermediate container (77) is separated, thereby the battery cell container (21) is obtained.

17 Claims, 12 Drawing Sheets

(51) Int. Cl.
  *B21C 1/26*    (2006.01)
  *H01M 50/103*  (2021.01)
  *H01M 50/133*  (2021.01)
  *B21C 1/00*    (2006.01)
  *B21C 23/00*   (2006.01)

(52) U.S. Cl.
  CPC ....... *H01M 50/103* (2021.01); *H01M 50/133* (2021.01); *B21C 1/00* (2013.01); *B21C 23/00* (2013.01)

(58) Field of Classification Search
  CPC ......... B21C 23/186; B21C 1/00; B21C 23/00; Y02E 60/10; Y02P 70/50
  See application file for complete search history.

(56) References Cited

FOREIGN PATENT DOCUMENTS

| | | | |
|---|---|---|---|
| DE | 698 22 448 T2 | 1/2006 | |
| DE | 698 37 291 T2 | 11/2007 | |
| EP | 1 347 519 A1 | 9/2003 | |
| EP | 1 586 389 B1 | 10/2008 | |
| JP | 06297068 A | 10/1994 | |
| JP | H 6-297068 A | 10/1994 | |
| JP | H10321198 A | 12/1998 | |
| JP | 2001-79635 A | 3/2001 | |
| JP | 2001079635 A | 3/2001 | |
| JP | 3 222 969 | 8/2001 | |
| JP | 3222969 B | 8/2001 | |
| JP | 2003-157809 | * 5/2003 | ............. C22C 21/00 |
| JP | 3 492 926 | 11/2003 | |
| JP | 3492926 B | 11/2003 | |
| JP | 1 447 864 A1 | 8/2004 | |
| JP | 4145594 | 6/2008 | |
| JP | 5355883 | 9/2013 | |
| JP | 5355883 B | 9/2013 | |
| JP | 2013 225406 A | 10/2013 | |
| JP | 2013225406 A | 10/2013 | |
| JP | 3 604 879 | 10/2014 | |
| JP | 2013-225406 A | 10/2023 | |
| JP | 2013225406 A | 10/2023 | |
| KR | 10 2009 0095547 A | 9/2009 | |
| KR | 10 2010 0 097 262 A | 9/2010 | |
| KR | 2014 0093471 A | 7/2014 | |
| KR | 10-1621253 | 5/2016 | |
| KR | 101 621 253 B1 | 5/2016 | |
| WO | WO 2006/078 690 A2 | 7/2006 | |

OTHER PUBLICATIONS

Original Notice of a Preliminary Rejection issued by the Korean Patent Office dated Feb. 9, 2021, for the corresponding Korean patent application No. KR 10-2019-7015640, in the Korean language.
English translation of a Second Office Action of the Chinese Patent Office dated Nov. 18, 2020 for a corresponding Chinese Patent Application No. 201790068540.5 filed Oct. 30, 2017.
Original Second Office Action of the Chinese Patent Office in the Chinese language for the corresponding Chinese Patent Application No. 201780068540.5 filed Oct. 30, 2017.
English translation of Japanese Patent Office Action dated Jun. 25, 2020, for the corresponding Japanese Patent Application No. 2019-521368 (3 pages).
Japanese Patent Office Action dated Jun. 25, 2020, for the corresponding Japanese Patent Application No. 2019-521368 in the Japanese language.
Foreign patnet document: JP 5 929 619, dated May 13, 2016, Country—Japan, no English translation available, 24 pages.
DE 1 001 095 A, Germany, Date: Jan. 17, 1957 (No translation); GB 748-719., Great Britain, Date: May 9, 1956.
English translation of the "International Search Report" for the corresponding international application No. PCT/EP2017/0777233, dated Jan. 23, 2018; 3 pages.
English translation of an Office Action fo the Japanese Patent Office dated Mar. 11, 2020 for a corresponding Japanese Patent Application No. 2019-521368.
Corresponding Japanese Patent Application No. 2019-521368 in the Japanese language.
E2: English translation of KR 10 2010 0 097 262 A.
E3: Excerpt from Handbook UmformtechniklSchuler GmbH.
Entry of a Third Party dated Apr. 15, 2019 (in the corresponding German patent application No. 10 2016 121 089.7).
Office Action by the German Patent Office in the German language dated Aug.t 18, 2020, for the corresponding German patent application no. 10 2016 121 089.7.
Google English translation of the German Patent Office Action dated Aug. 18, 2020 for the corresponding German patent application no. 10 2016 121 089.7.
Google English translation of the cited document "Entry of a Third Party dated Apr. 15, 2019" (in the corresponding German patent application No. 10 2016 121 089.7).
English translation of an Office Action of the Chinese Patent Office dated Mar. 27, 2020 for a corresponding Chinese Patent Application no. 2017800685405 filed Oct. 30, 2017.
Office Action of the Chinese Patent Office in the Chinege language.

* cited by examiner

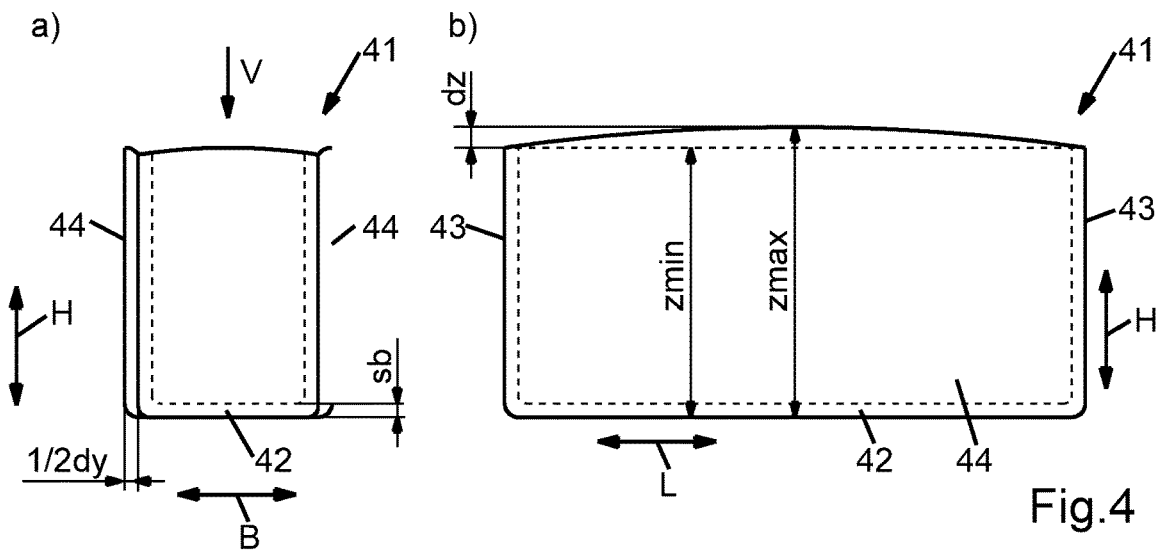
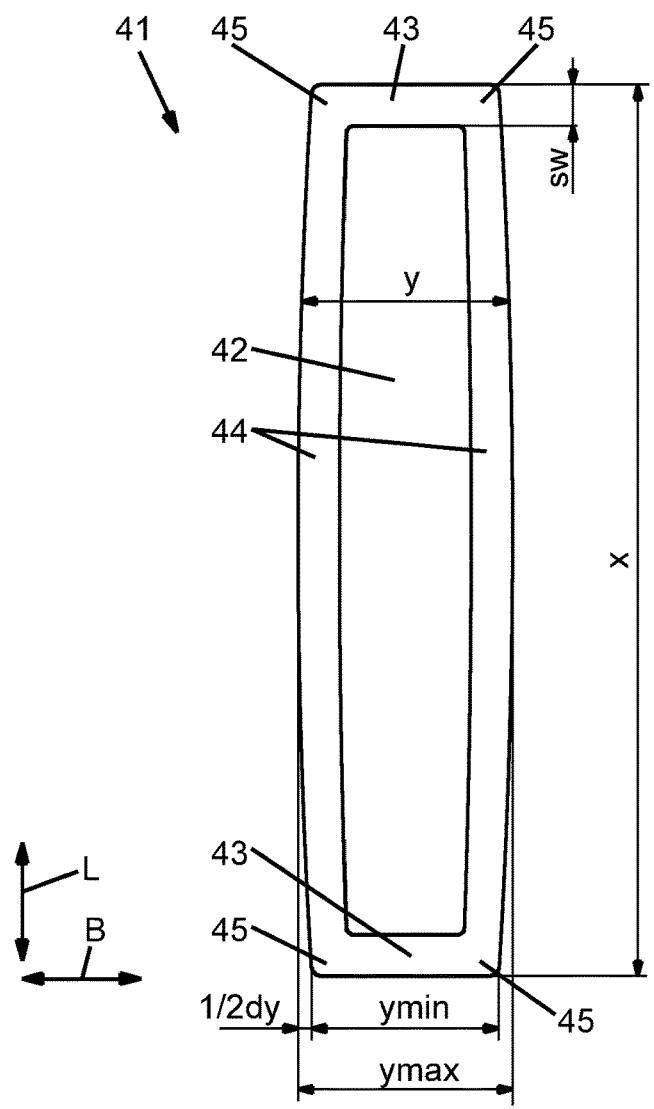
Fig.4
Fig.5

METHOD AND DEVICE FOR PRODUCING A PRISMATIC BATTERY CELL CONTAINER

CROSS-REFERENCE TO RELATED APPLICATIONS

This is a continuation-in-part application of pending international application PCT/EP2017/077723 filed Oct. 30, 2017, and claiming the priority of German application No. 10 2016 121 089.7 filed Nov. 4, 2016. The said International application PCT/EP2017/077723 and German application No. 10 2016 121 089.7 are both incorporated herein by reference in their entireties as though fully set forth.

BACKGROUND OF THE INVENTION

The invention refers to a method and a device for producing a unilaterally open prismatic battery cell container. The battery cell container can have a cuboid shape for example. The battery cell container serves to accommodate core material, like a wrap, that provides electrical energy. After inserting the core material the unilaterally open battery cell container is closed by means of a cover.

Battery cell containers are available in different forms. They can be manufactured from metallic materials or plastic materials. The need for batteries is increasing progressively. On one hand in many fields the trend is toward battery-operated electric apparatus or vehicles. On the other hand batteries are also required for storing electrical energy, particularly in the field of electric power supply by renewable energies, like wind power or solar energy.

Due to the high number of required battery cells or battery cell containers respectively, methods are necessary to manufacture such battery cell containers economically with sufficient dimensional accuracy. In doing so, some challenges exist.

For manufacturing of battery cell containers of a metal or a metallic alloy, known methods like deep drawing or extrusion can be used. Deep drawing is a method for forming sheet metal. As initial blank a sheet metal is required. The degree of forming is limited in view of the relation between the height of the battery cell container to its width.

For extrusion of battery cell containers a large material usage is necessary. Shaping of such a manufactured battery cell container is limited to certain geometries or dimensions respectively, in order to achieve the necessary material flow.

DE 698 22 448 T2 proposes a method for manufacturing a battery cell container during which an iron-based metallic sheet metal having a nickel layer on one sheet metal side is formed into a cup or pot respectively by drawing. Subsequently a battery cell container is shaped by ironing. Such a method requires the manufacturing of a respective cup or pot first for the drawing operation.

Such a method is called DI-method. "D" stands for the English word "Drawing" and "I" stands for the English word "Ironing", that is for deep drawing and ironing. Such DI-methods are for example also known from the manufacturing of drink cans.

Similar manufacturing methods that start with a deep drawing step are also known from DE 694 17 001 T2 and DE 698 37 291 T2.

DE 1 001 095 A describes a method for manufacturing cylindrical metallic hollow bodies. From an impact extrusion slug a circular disc having peripheral bead is manufactured first that is subsequently formed into a unilaterally open cylindrical body by forward extrusion.

From GB 748719A a method for manufacturing a battery with a battery cell container of plastic is known. The plastic housing is unilaterally open and can contain a rest protrusion for a cover adjacent to the open side. The cover can engage into a closed peripherally extending groove at the battery cell container by means of a force-fit connection.

Starting herefrom it is an object of the present invention to provide an improved manufacturing method for a metallic battery cell container that guarantees economic manufacturing at sufficient good dimensional accuracy and a device for accomplishing the method.

SUMMARY OF THE INVENTION

This object is solved with a method and device according to the features of the claims.

According to the invention a slug is provided. It is integrally manufactured from one uniform material without seam and joint location. The slug consists of at least one metal and/or at least one metallic alloy. Preferably it consists of an aluminium alloy. The slug has for example prismatic and for example a cuboid shape.

The slug is formed into an extruded container by extrusion and for example backward extrusion. This is a massive forming method. The slug can be obtained from a rod-shaped or plate-shaped material by cutting to length in a simple and cost-efficient manner. By extrusion the rod-shaped or plate-shaped material can have a pre-defined rectangular or nonrectangular cross-sectional form. Alternatively, the slug can be separated from a sheet material, e.g. by stamping or cutting.

The extruded container is subsequently transported to a first ironing station. The first ironing station contains a first ironing ram and a first die tool. The first ironing ram is moveable in a working direction toward the die tool or into the die tool. As soon as it reaches a reversal point in the region of the first die tool, it can be moved backward into a retracted position in a retraction direction opposite the working direction. During movement in working direction the first ram, in cooperation with the first die tool, forms the extruded container into an ironed container by a first ironing process. In doing so, the extruded container is not moved in working direction completely through the first die tool by the first ironing ram, but only to the reversal point and is then moved in a retracting direction together with the first ironing ram again out of the die tool.

After the first ironing the ironed container is transported into a second ironing station and is there, by a second ironing ram and a second die tool, subject to a second ironing. Analog to the first ironing, the ironed container is also moved only partly in working direction through the second die tool by the second ironing ram in the second ironing station and is moved together with the second ironing ram in retracting direction again out of the second die tool. At the end of the second ironing station the ironed container is formed into an intermediate container. The intermediate container is dimensionally accurate in a length direction and a width direction, but not in a height direction that is orientated parallel to the working direction and the retracting direction.

In the last step the top edge of the intermediate container is finally separated and thus the dimensional accuracy is also provided in height direction and the battery cell container is obtained.

In the two ironing stations the respective container is not completely moved through the respective die tool. Due to pulling the container back in retracting direction by the respective ironing ram, the possibility is obtained to further transport the formed container at the same plane level, at which it was transported into the respective ironing station. This simplifies the manufacturing process and a corresponding manufacturing device. Stripping off of the container from a respective ironing ram is carried out with view in working direction spatially before the respective die tool and temporarily after the forming during the retraction movement of the respective ironing ram.

With this method also prismatic battery cell containers can be manufactured that have remarkably different dimensions in a width direction and a length direction orientated rectangular thereto. For example, the dimension in length direction can be at least about the factor 4 to 5 and preferably at least about the factor 7 larger than in width direction. This applies to prismatic battery cell containers with rectangular as well as with a polygonal cross-section or bottom respectively.

It is advantageous, if the extruded container comprises a polygonal bottom, which dimension in one direction is at least about the factor 4 to 7 larger as in the other direction, wherein the two directions are orientated rectangular to each other and span one plane that extends parallel to the bottom. The mold and the press ram in the extrusion station is dimensioned accordingly.

It is advantageous, if the bottom of the extruded container comprises four corner regions, two length sides and two width sides. The length side can be at least 4 to 5 times and preferably at least 7 times longer than the width side.

The extruded container can comprise at least one pair of length side walls that are opposed to each other and cambered away from each other. The length side walls can be curved or cambered about at least one axis of curvature that extends preferably parallel to the height direction.

The top edges of the length sides and/or the width sides of the extruded container can have a curved extension and can have a lower height in the corner regions than in a middle section between the corner regions. A maximum height of a side wall and particularly a length side wall can be about 5% to 20% and preferably about 7% to 17% higher in the middle section than the minimum height in one of the corner regions.

In one embodiment the distance of the length side walls of the extruded container in the middle between the corner regions is at least about 5% to 10% larger than the distance at the corner regions. Accordingly, in the mold for extrusion the distance between the two inner walls that extend in length direction is in the middle between the corner regions about at least 5% to 10% larger than in the corner regions of the mold.

In a preferred embodiment the bottom of the extruded container has a thickness that corresponds to a pre-defined target thickness of the battery cell container. Thus, additional forming of the bottom subsequent to the extrusion is not necessary. The thickness of the bottom is preferably smaller than the wall thickness of the side walls, that is the length side walls and the width side walls of the extruded container.

A target value of the wall thickness of the side walls of the extruded container can be in the range of 0.5 mm to 1.5 mm and preferably from 0.7 mm to 1.1 mm, including the respective range limits. In doing so, the wall thickness of the side walls can be reduced substantially to the desired width already in one single ironing process by one single die tool. The number of subsequent processing steps can thus be minimized. In order to allow ironing, it is advantageous if the wall thickness of the side walls of the extruded container differs at most about 0.3 mm and particularly at most about 0.1 mm from the pre-defined target value of the completely manufactured battery cell container.

It is also preferred, if the extruded container is provided with drawing oil or another lubricant before the first ironing process. The lubricant is at least applied at the outer side of the side walls of the extruded container, because the forming work in contact with the die tool takes place at this location during ironing. Due to the lubricant the friction is specifically influenced.

In an advantageous embodiment of the method a rest step with a defined height distance toward the bottom is formed during the first ironing and/or the second ironing in the side walls of the extruded container or the intermediate container respectively. The rest step serves as rest surface for a cover with which the unilaterally open battery cell container can be closed after insertion of the core material, e.g. the wrap.

Preferably the first ironing ram and/or the second ironing ram comprises a protrusion for forming the rest step that is arranged at the pre-defined height distance away from the respective end face of the respective ironing ram. The protrusion is in particular circumferentially closed provided at the ironing ram and extends away in a plane that is orientated rectangular to the working direction and the retracting direction. It is also advantageous, if the wall thickness of the side walls of the extruded container is reduced during the first ironing in a region of about 5% to about 30% and preferably of about 10% to 20%. In doing so, the target thickness of the side walls can be approximately achieved already during the first ironing process.

It is particularly preferred, if the wall thickness of the side walls of the extruded container is reduced about less than 1% during the second ironing process. The inner diameter of the die tool in the second ironing station is as large as or smaller than the inner diameter of the die tool in the first ironing station. Due to elasticities of the material, the extruded container enlarges again to some extent after pull-out of the first die tool. Then it obtains its final shape by the second ironing in the second ironing station.

The wall thickness of the side walls of the manufactured battery cell container differs from a pre-defined target value of the completely manufactured battery cell container due to the above-described method about at most 0.1 mm and preferably about at most 0.05 mm and further preferably about at most 0.01 mm.

BRIEF DESCRIPTION OF THE DRAWINGS

Preferred embodiments of the invention can be obtained from the claims, the description and the drawings. In the following preferred embodiments of the invention are described in detail with reference to the drawings that show:

DETAILED DESCRIPTION OF THE INVENTION

Figure 15:
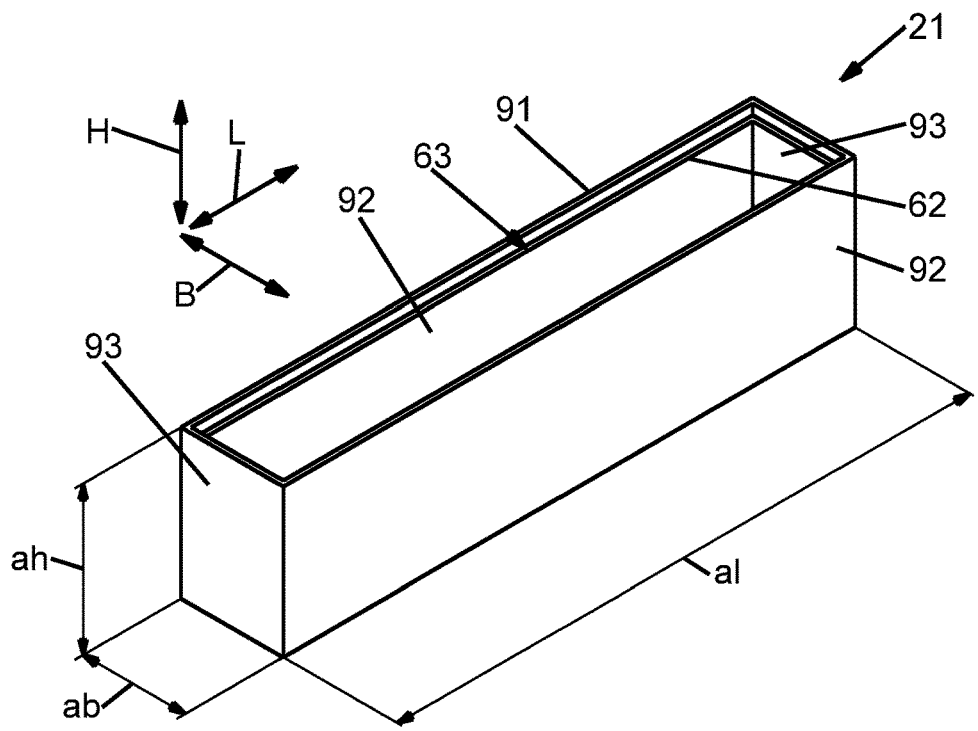
Figure 16:
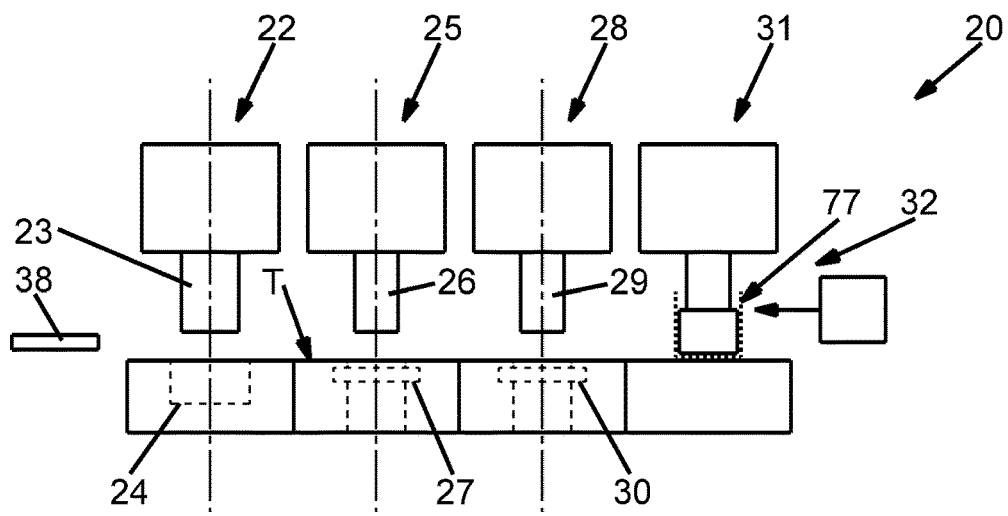

In FIG. 16 an embodiment of a device 20 is highly schematically illustrated that is configured for manufacturing a unilaterally open prismatic and, according to the example, cuboid-shaped battery cell container 21. The device 20 comprises in the embodiment an extrusion station 22 with a press ram 23 and a press mold 24, a first ironing station 25 with a first ironing ram 26 and a first die tool 27, a second ironing station 28 with a second ironing ram 29 and a second die tool 30, as well as a separating station 31 with a separating device 32. Details of the device 20 are explained in connection with FIGS. 1-15 and the explanation of the method.

The manufacturing of the battery cell container 21 is executed stepwise, first by extrusion of a slug 38 in the extrusion press station 21. The slug 38 has a cuboid shape in one embodiment (FIG. 1a). The length of the slug 38 is compared with the width of the slug about the multiple larger and for example about the factor of at least 4-5 or at least 7. The shape of the slug 38 is approximately adapted to the press mold 24 into which the slug 38 is inserted for extrusion.

In FIGS. 1b and 1c different contours of the slug 38 are illustrated. In the area of the short side (width of the slug) more material is necessary during a subsequent extrusion for forming the slug 38 into an extruded container, as in the mid area of the longer sides of the slug 38. The slug 38 can have a larger cross-section area in the two length end regions adjacent to the short sides than in the mid region between the two length end regions.

To achieve this, thickness of the slug can vary in one example and can respectively increase the direction toward the shorter sides starting from the mid region (FIG. 1b). Alternatively or additionally, the width of the slug 38 can vary and can be least in a mid region in its length direction and starting therefrom increase toward the two short sides, as schematically shown in FIG. 1c. This embodiment has the shape similar to an hour glass or a bone in top view onto the top side of the bottom side of the slug 38. In doing so the two small sides extending in length direction are, for example, concavely cambered inwards toward each other, such that the slug 38 has a waisted shape.

In the embodiment the massive forming of the slug 38 for manufacturing the extruded container 41 is carried out by a so-called backward extrusion. In doing so, the slug is first inserted into the press mold 24. Subsequently the press ram 23 is inserted into the press mold 24, wherein circumferential gap 40 remains between the inner walls 39 of the press mold 24 and the press ram 23. The material flows into this gap 40, if the press ram 23 presses the slug 38 against the bottom of the press mold 24 and thereby forms the slug 38. In doing so, an extruded container 41 is created (FIGS. 4a, 4b and 5).

The extruded container 41 has a bottom 42 and according to the example, four side walls 43, 44 that adjoin a respective side of the bottom 42 and thus form a unilaterally open integrally formed extruded container 41. The extruded container 41 has two width side walls 43 that extend in a width direction B and two length side walls 44 that extend in a length direction L. The length direction L and the width direction B are orientated rectangular to each other and span a plane that extends parallel to the bottom 42. A dimension of the extruded container 41 in length direction L corresponds to a length x and a dimension in the width direction B of the extruded container 41 corresponds to a width y.

The width y is for example non-constant. The extruded container 41 has a minimum width ymin at the exemplary four corner regions 45 and the extruded container 41 has a maximum width ymax in length direction L between the two adjacent corner regions 45 that are connected by one of the length side walls 44. The maximum width ymax is preferably present in the middle of the extruded container 41 in length direction L. The different width y is obtained, due to an outwardly cambered shape of the length side walls 44, the distance thereof increases from the corner regions 45 to the middle of the extruded container 41 in length direction L and starting therefrom decreases toward the corner regions 45. With view from outside onto a length side wall 44 of the extruded container 41 it has a convex camber along its extension in length direction L. A difference dy between the maximum width ymax and the minimum width ymin is thus obtained by the length side walls 44 that camber away from each other. The maximum width ymax is preferably about at least 5% to 10% larger than the minimum width ymin.

The top edges of the side walls 43, 44 of the extruded container 41 can have a curved extension (FIGS. 4a, 4b). A height z of the side walls 43, 44 of the extruded container 41 is thus non-constant, but varies. A maximum height zmax can be achieved, e.g. in the mid region of a side wall 43, 44, and a minimum height zmin can be present in one of the two adjacent corner regions 45 bordering one of the two respective side walls 43, 44. The maximum height can be 5% to 20% or particularly 7% to 17% higher than the minimum height zmin, so that a difference dz in the height z is obtained (FIG. 4b). This height difference applies at least for the longer of the side walls, i.e. here the length side walls 44.

The thickness or size sb of the bottom 42 of the extruded container 41 corresponds substantially to the target value of the thickness of the bottom of the battery cell container 21. In the further forming steps of the extruded container 41 the thickness sb of the bottom is not substantially changed. The thickness sb of the bottom 42 is in its amount smaller than the wall thickness sw of the side walls 43, 44 of the extruded container 41. The wall thickness sw of the side walls 43, 44 can be approximately in the range of 0.5 mm to 1.5 mm and preferably from 0.7 mm to 1.1 mm, including the respective range limits. The deviation from the target value of the wall thickness sw has preferably an amount of at most 0.3 mm and further preferably of at most 0.1 mm. In doing so, the subsequent ironing of the extruded container 41 and the positioning of the extruded container 41 onto the first ironing ram 26 is simplified.

Figure 9:
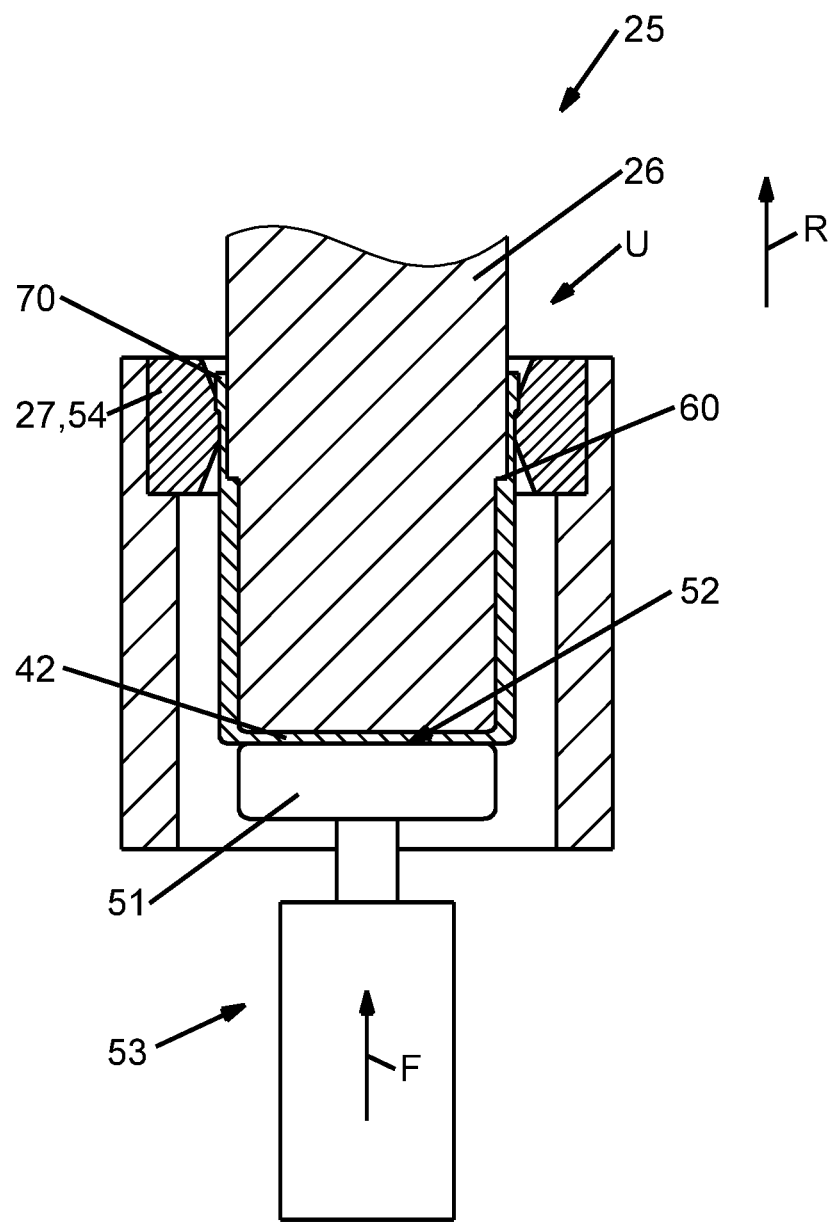

The extruded container 41 is transported from the extrusion station 22 into the first ironing station 25 preferably along a transport plane T. In the first ironing station 25 the extruded container 41 is positioned aligned with the first ironing ram 26. The extruded container 41 can be positioned onto a counter holder 51 below the first ironing ram 26. The first ironing ram 26 is moveable from a retracted position in a working direction A toward the first die tool 27 until it reaches a reverse position U (FIG. 9). Starting from this reverse position U, the first ironing ram 26 can be moved back into the retracted position in a retracting direction R that is opposite the working direction A. The first ironing ram 26 carries out a linear movement along its longitudinal axis during its movement in working direction A or in retracting direction R respectively.

Figure 1:
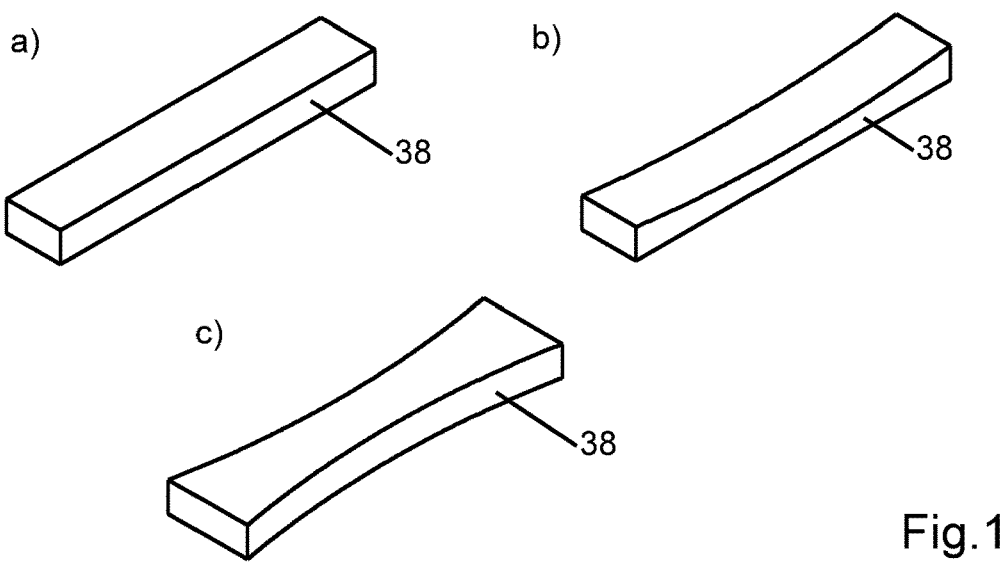
FIGS. 1a, 1b and 1c a schematic perspective illustration of an embodiment of a slug respectively, FIG. 2 a schematic illustration of a press station for extrusion in a longitudinal section, FIG. 3 the extrusion station of FIG. 2 in a top view onto the press mold according to sectional line III-III in FIG. 2, FIGS. 4a and 4b a schematic side view of an extruded container respectively, FIG. 5 a schematic top view onto the extruded container of FIG. 4a according to arrow V, FIGS. 6-10 a schematic illustration of a first ironing station in different states during the first ironing of the extruded container respectively, FIG. 11 a schematic illustration of the transfer of the container ironed in the first ironing station to the second ironing station, FIG. 12 a schematic illustration of a second ironing station, FIG. 13 a schematic illustration of a separating station for separating a top edge from the intermediate container supplied from the second ironing station, FIG. 14 a cross-section illustration through the manufactured prismatic, unilaterally open battery cell container, FIG. 15 a schematic perspective illustration of the manufactured battery cell container, FIG. 16 a schematic block-diagram-like illustration of a device for manufacturing the battery cell container and FIG. 17 a schematic partial illustration of a preferred embodiment of an ironing ring.
Figures 2, 3:
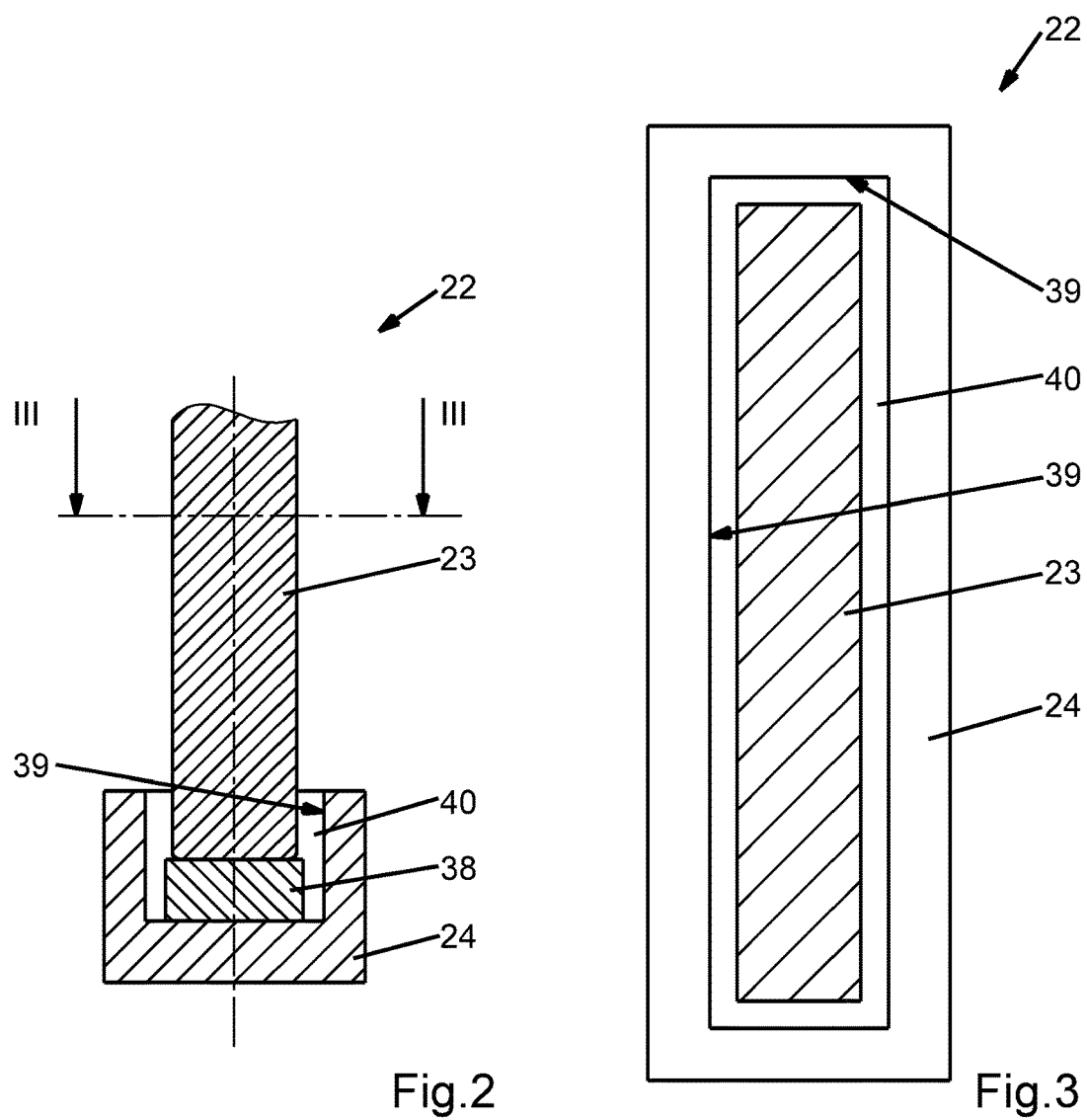
Figure 6:
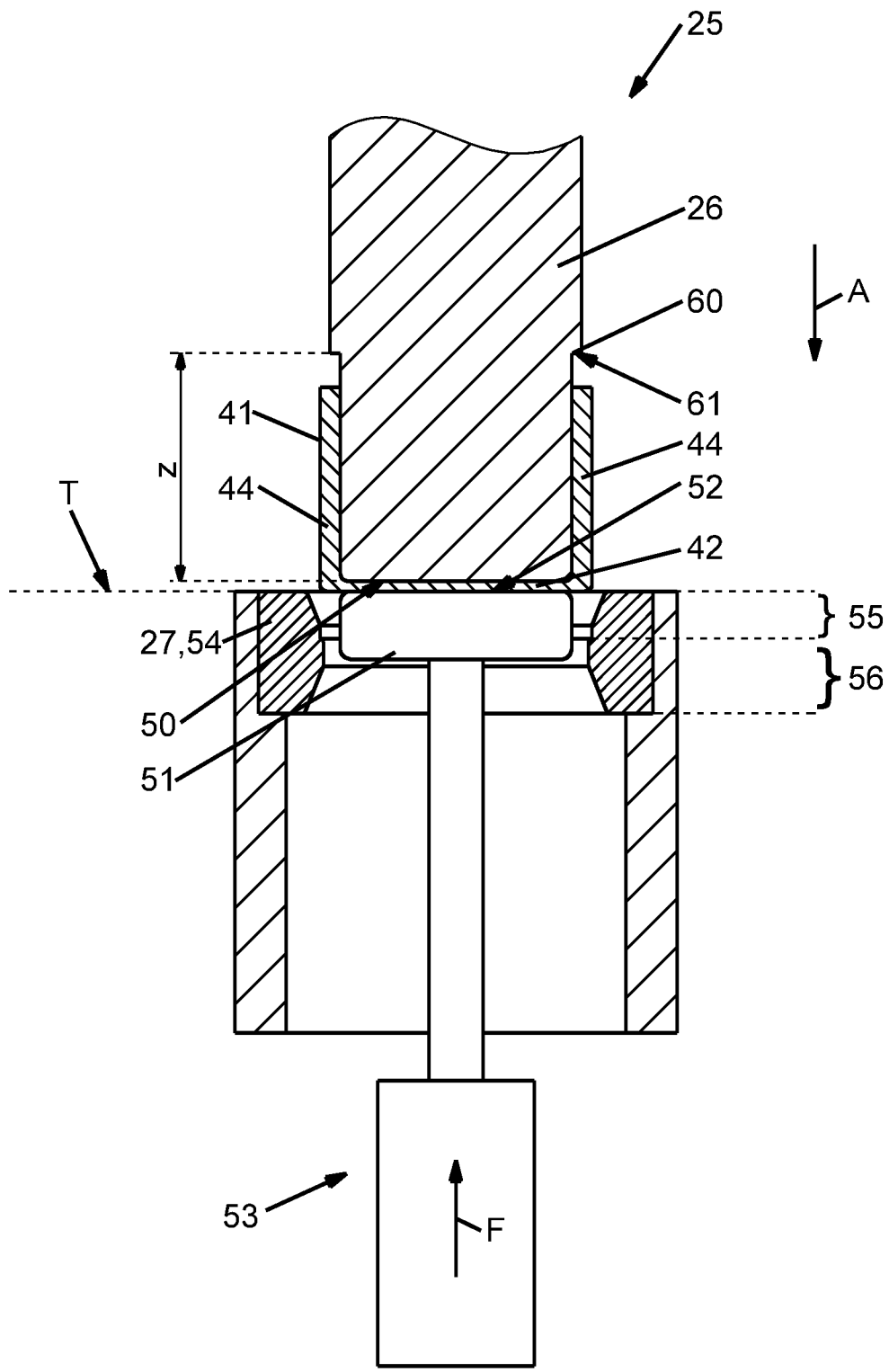

The first ironing ram 26 has in the cross-section a rectangular shape that corresponds to the inner form of the battery cell container 21 to be manufactured. The first ironing ram 26 has an end face 50 that is orientated rectangular to the working direction A. After start of the movement of the first ironing ram 26 in working direction A, starting from its non-illustrated retracting position the first ironing ram 26 engages into the extruded container 41 until its end face 50 is in contact with the bottom 42 of the extruded container 41 (FIG. 6). In doing so, the extruded container 41 is supported by a counter holder 51. The counter holder 51 has a supporting surface 52, onto which the lower side of the bottom 42 of the extruded container 41 lies. The counter holder 51 is biased with a biasing force F in retracting direction R and thus opposite the working direction A by a biasing device 53. The biasing device 53 can be a spring device and particularly a gas spring device for example. The counter holder 51 can be moved against the biasing force F in working direction A due to the movement of the first ironing ram 26. The biasing force F is sufficiently high to support the engagement of the first ironing ram 26 into the extruded container 41 and to clamp the bottom 42 during forming between the end face 50 and the supporting surface 52, such that during forming or ironing of the extruded container 41 respectively a non-intended deformation of the bottom 42 is avoided. During the first ironing in the first ironing station 25 the support surface 52 is always in contact with the bottom 42.

The first die tool 27 is formed by one or more ironing rings 54. In the embodiment in cooperation with the first ironing ram 26 two processing steps or forming steps are achieved with the first die tool 27. The tool forming steps can be achieved by two separate ironing rings 54 or one common ironing ring 54 with a first ring section 55 and a second ring section 56. In the illustrated preferred embodiment in working direction A the ironing ring 54 is divided into a first ring section 55 and a directly adjacent second ring section 56. The ironing ring 54 is formed integrally from a uniform material. Two separate ironing rings or two ring sections 55, 56 of different materials that are separated from one another could also be used.

Figure 7:
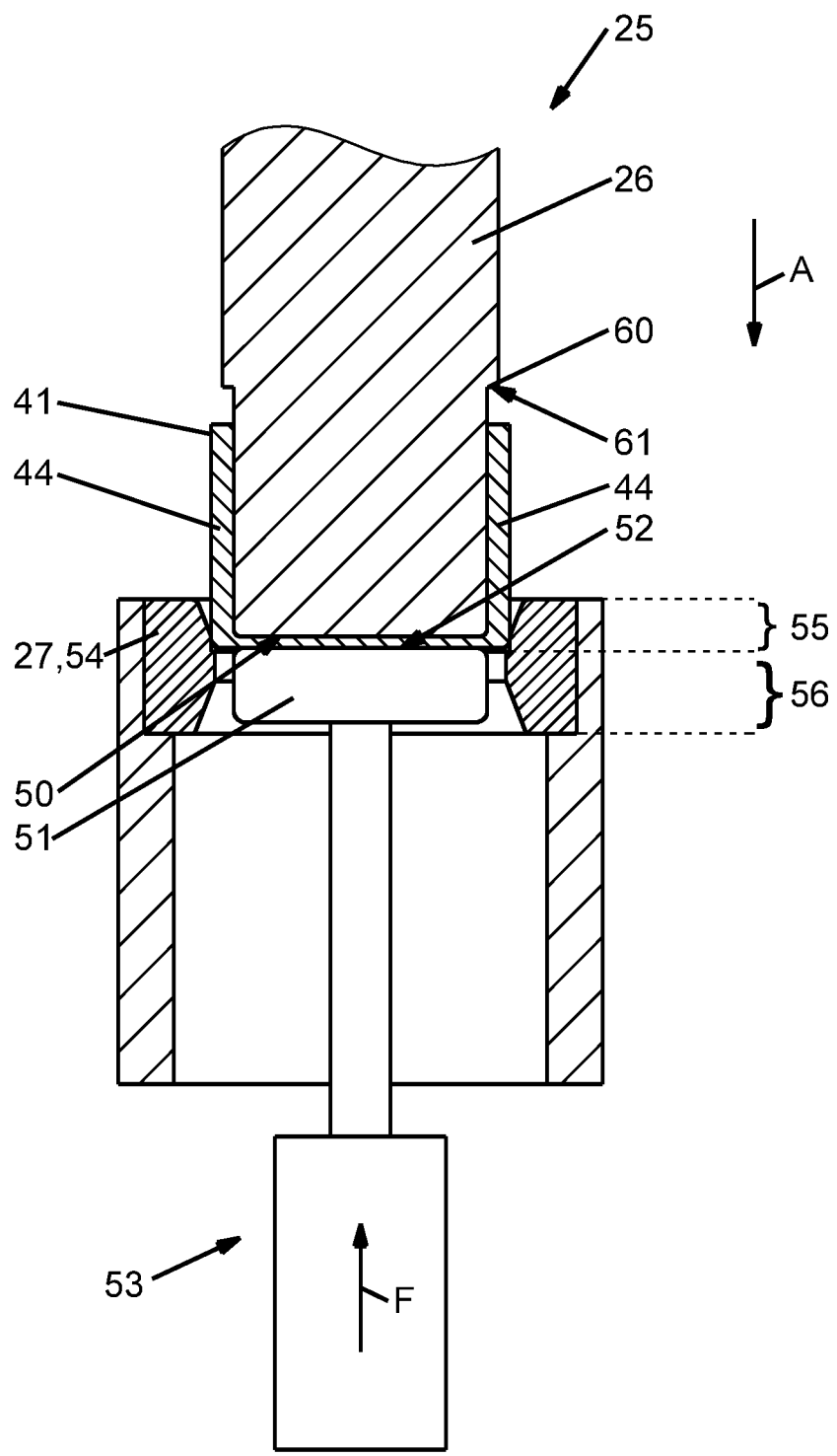

The first ring section 55 has an inner diameter that is larger than the inner diameter of the second ring section 56. If the extruded container 41 is moved into the first ironing ring 54 or the first ring section 55 respectively in working direction A by the first ironing ram 26, a first forming of the side walls 43, 44 is carried out so that a fixation of the extruded container 41 at the first ironing ram 26 is achieved. The forming degree that is achieved by the first ring section 55 is low and particularly lower than the forming degree achieved by the adjacent second ring section 56. This processing step of the fixation is schematically shown in FIG. 7.

Figure 8:
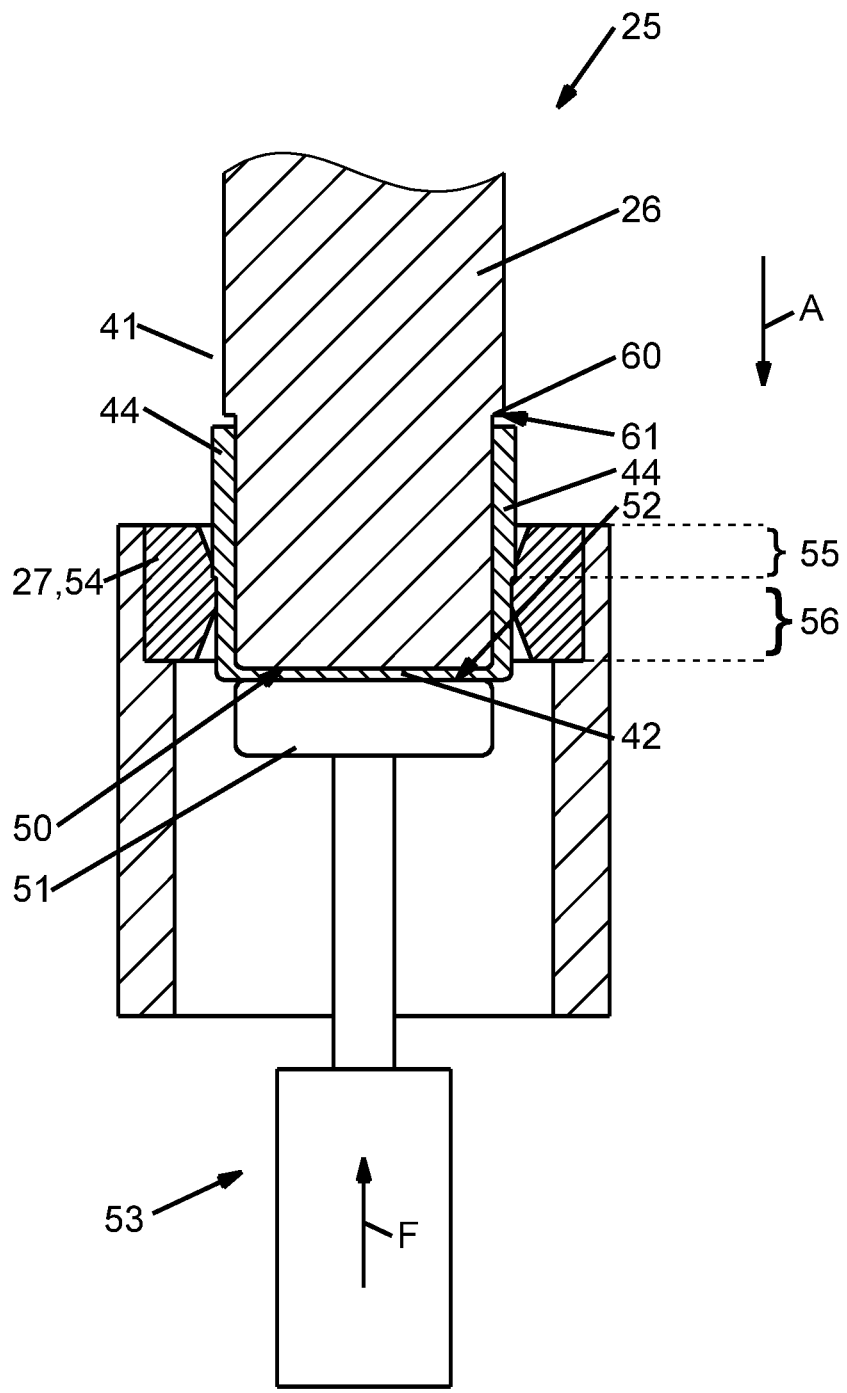

Due to a continued movement of the first ironing ram 26 in working direction A, the extruded container 41 is moved through the second ring section 56, wherein the forming of the side walls 43, 44 is actually carried out (FIG. 8). The wall thickness sw of the side walls 43, 44 decreases, while the height of the side walls 43, 44 in height direction H increases that is orientated rectangular to the length direction L and the width direction B. The height direction H is parallel to the working direction A or the retracting direction R respectively.

The cross-section of the first ironing ram 26 is not constant according to the example. With distance to the end face 50 the first ironing ram 26 has a circumferential projection 60. The projection 60 forms so to say a ring-shaped closed step with a protrusion surface 61 that extends in a plane that is orientated rectangular to the working direction A in the embodiment. In the example the protrusion surface 61 has a normal vector that extends parallel to the working direction A. In the retracted position of the first ironing ram 26 the protrusion surface 61 is facing the first die tool 27.

Different to the preferred embodiment, the protrusion surface 61 can also be orientated at an angle different to 90 degrees with reference to the working direction A.

Due to the protrusion 60, the cross-section area increases from the end face 50 of the first ironing ram 26. The distance between the protrusion 60 and the end face 50 corresponds or defines a height distance z.

If now, due to further forming of the side walls 43, 44, the height of the side walls is increased, the material flows along the ironing ram 26 over the protrusion 60. The material flow over the protrusion 60 is schematically shown in FIG. 9. There the first ironing ram 26 has achieved the reverse position U and reverses its movement direction from a movement in working direction A into an opposite movement in retracting direction R. In doing so, it can be seen that the container is not completely moved through the first die tool 27.

Due to the material flow over the protrusion 60, a rest step 62 is formed at the side walls (compare FIGS. 11 and 13-15). The rest step 62 provides a rest surface 63 for a cover that can be inserted adjacent to the opening of the battery cell container 21 into the battery cell container 21 and laid onto the rest surface 63. By means of such a cover, the battery cell container 21 will be closed after inserting of the core material.

The orientation of the rest surface 63 corresponds to the orientation of the protrusion surface 61. According to the example, the rest surface 63 is orientated rectangular to the height direction H of the battery cell container 21.

Figure 10:
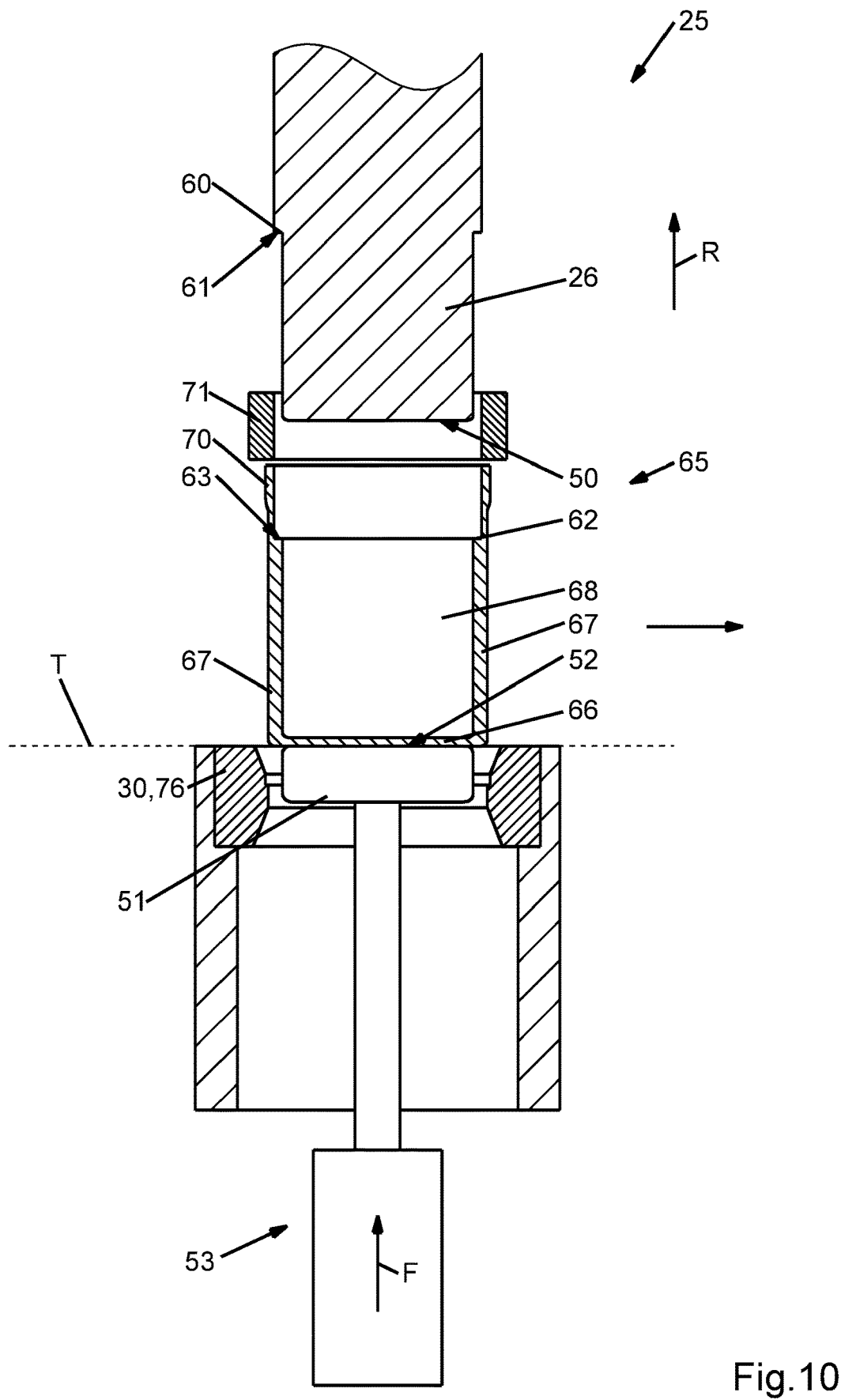

In the first ironing station 25, due to the first ironing an iron container 65 is obtained that is deformed from the extruded container 41. A strip device 71 is present that strips off the ironed container 65 from the first ironing ram 26 during movement of the first ironing ram 26 in retracting direction R (FIG. 10). For example the strip device 71 can be formed by a strip ring that is arranged coaxially to the first ironing ram 26. The first strip device 71 is arranged at a distance from the first die tool 27 or the transport plane T with view in retracting direction R. After stripping-off the stripped-off ironed container 65 is present onto the support surface 52 of the counter holder 51 that is approximately positioned in the transport plane T. This corresponds to the initial position of the counter holder 51.

Figure 11:
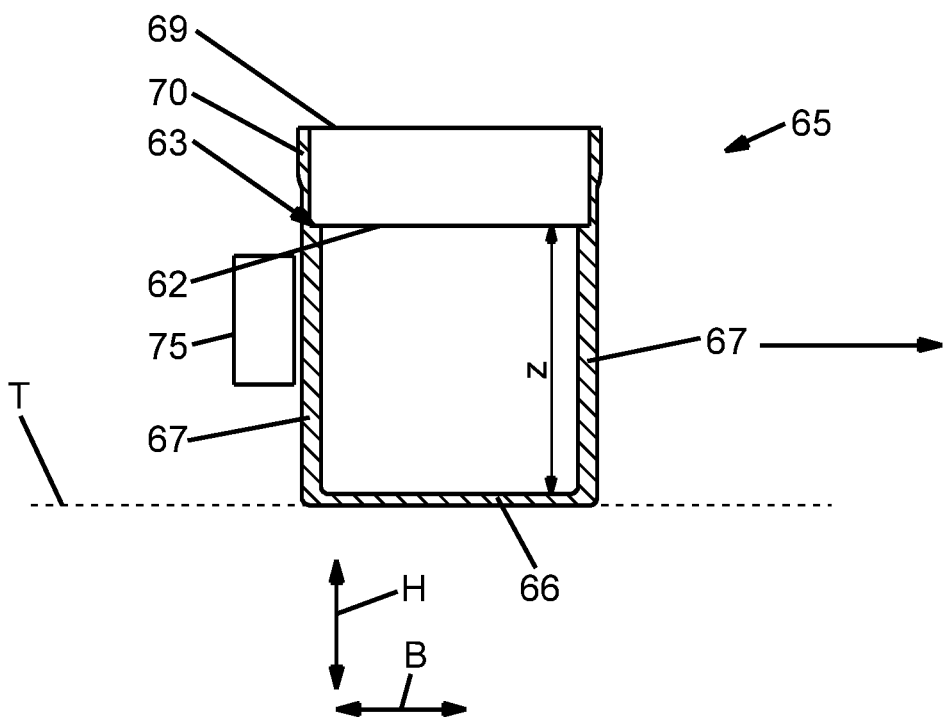
Figure 12:
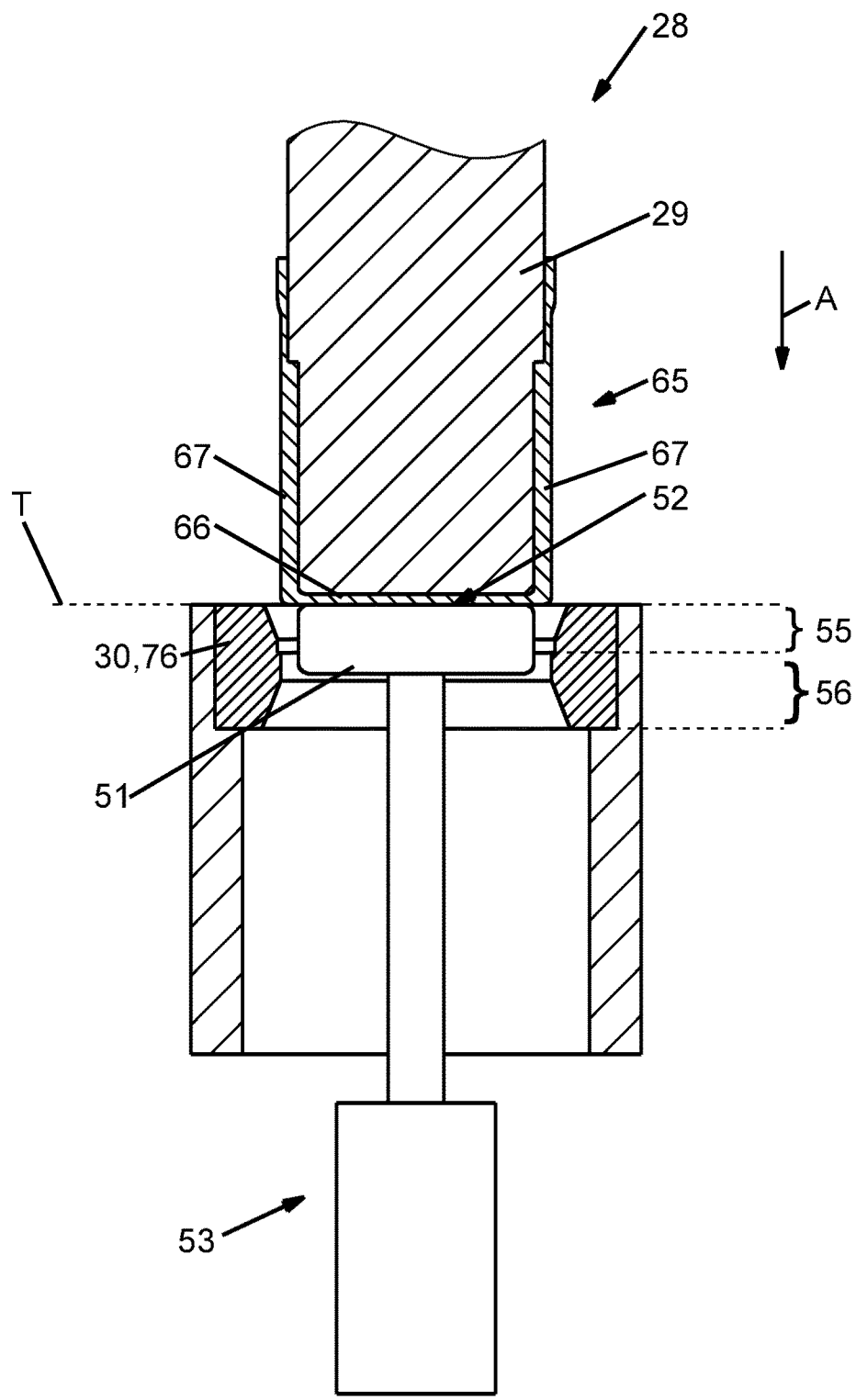

The ironed container 65 is schematically illustrated in FIGS. 10 and 11. It contains a bottom 66 that corresponds substantially to the bottom 42 of the extruded container 41. The ironed container 65 has four side walls, i.e. two length side walls 67 and two width side walls 68, only one of which can be seen in the cross-section in FIGS. 10 and 11. The side walls 67, 68 have adjacent to the opening 69 that is opposite to the bottom 66, an edge section 70 that was not or not completely moved through the first die tool 27. The edge section 70 surrounds the opening 69 in circumferential direction completely and forms an end of the side walls 67, 68 that has a larger wall thickness that approximately corresponds to the wall thickness sw of the extruded container 41. In contrast the wall thickness of the side walls 67, 68 of the ironed container 65 is about 20% to 30% less than the wall thickness sw of the extruded container 41. Due to the cross-section increase of the first ironing ram 26 adjacent to the protrusion 60, the wall thickness of the ironed container 65 is further reduced in height direction H toward the opening 69 between the rest step 62 and the edge section 70, wherein the wall thickness is here accordingly decreased about more than 20% to 30% compared to the wall thickness sw of the extruded container.

By a transfer device 75 that is only highly schematically illustrated, the ironed container 65 is moved along the transport plane T into the second ironing station 28 (FIG. 11). Such a transfer device 75 can also be used for the transport from the extrusion press station 22 into the first ironing station 25.

The ironed container 65 already has essentially the wall thicknesses, the bottom thickness and the dimensions in width direction B and in length direction L that correspond to the battery cell container 21 to be manufactured. In the second ironing station 28 only a minor forming is carried out by the second ironing of the ironed container 65. The wall thickness of the side walls 67, 68 is reduced in the second ironing station 28 during the second ironing about at most 1%.

The second ironing station 28 is essentially identically set up as the first ironing station 25, such that reference can be made to the above description. The only difference exists in that the second die tool 30 is formed by a second ironing ring 76, the dimensions or contours thereof can differ from the first ironing ring 54. The second ironing ring 76 is divided into a first ring section 55 and a second ring section 56 according to the first ironing ring 54. The diameter difference of the inner diameter of the first ring section 55 from the second ring section 56 is at the second ironing ring 76 less than at the first ironing ring 54. The inner diameter of the second ring section 56 of the second ironing ring 76 can correspond to the inner diameter of the second ring section 56 of the first ironing ring 54. Even though these inner diameters have the same size, forming work is carried out in the second ironing station 28 during the second ironing, because due to the elastic spring-back of the material of the ironed container 65 after the first ironing, an increase of the outer dimensions of the ironed container 65 occurs that is at least partly cancelled during the second ironing in the second ironing station 28.

The forming degree in the second ironing station 28 is low. Preferably, the wall thicknesses of the side walls 67, 68 of the ironed container 65 are reduced at most by 1%. The second ironing serves for calibration. The contours, particularly in the corner regions of the ironed container 65, are adapted and remaining too large radii of curvature in the corner regions are decreased if necessary.

Figure 13:
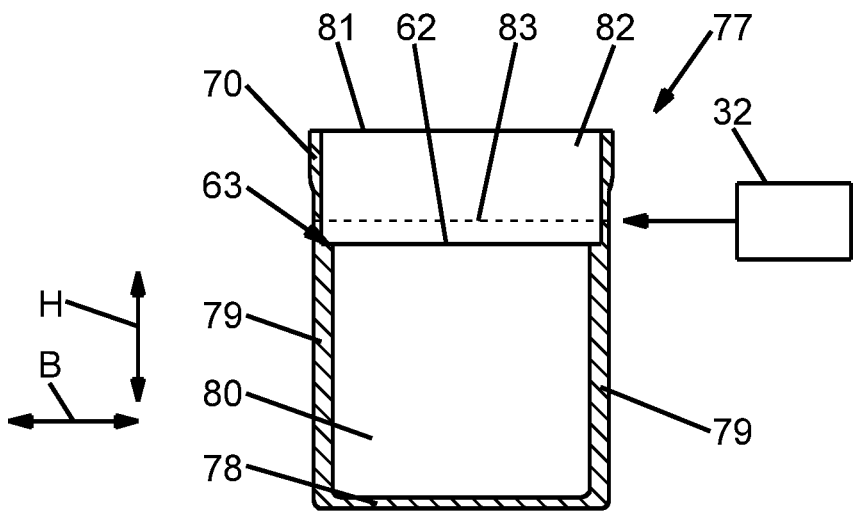

The course of the second ironing in the second ironing station 28 corresponds to the first ironing in the first ironing station 25, such that reference can be made to the description above. It is explicitly indicated here that the ironed container 65 is not completely moved through the second die tool 30 in working direction A during the second ironing in the embodiment, but is rather moved backward before at a respective reversal point opposite the working direction A in retracting direction R, as was also explained in connection with the first ironing. After the second ironing the ironed container 65 is formed into an intermediate container 77. The intermediate container 77 is stripped off from the second ironing ram 29 by a second strip device and is then present on the supporting surface 52 of the counter holder 51, wherein the lower side of the bottom is present approximately in the transport plane T. The intermediate container 77 is illustrated in FIG. 13. Because the intermediate container 77 corresponds substantially to the ironed container 65 in the embodiment, reference is made to the description of the ironed container 65 above for the description of the shape. The intermediate container 77 thus has a bottom 78 from which two length side walls 79 and two width side walls 80 extend to an opening 81. The rest step 62 with the rest surface 63 as well as edge section 70 is still present at the intermediate container 77.

Figure 17:
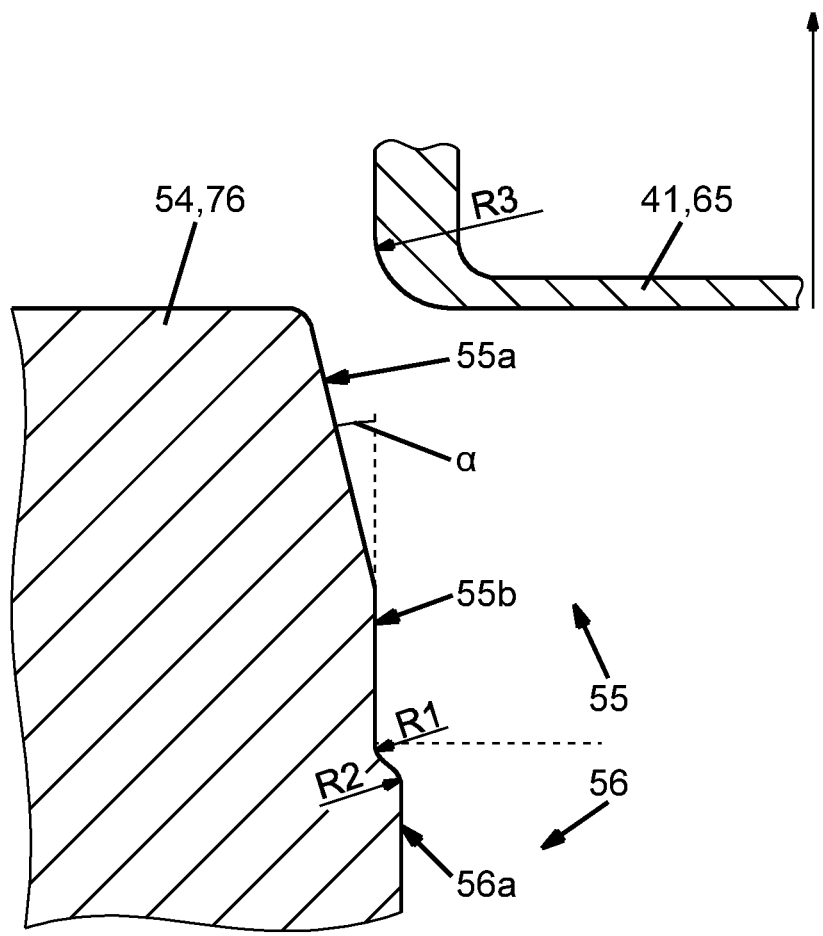

FIG. 17 illustrates a section of the first ironing ring 54 or the second ironing ring 76 with a preferred design of the inner surface that gets into contact with the extruded container 41 or the ironed container 65 respectively during ironing. At the upper side opposite the second ring section 56 the first ring section 55 has a conical insertion surface 55a that widens away from the second ring section 56. In doing so, the inclination angle α compared with working direction A can have an amount of 2 to 5 degrees and for example 3 degrees. A skin surface 55b of the first ring section 55 that is orientated parallel with working direction A, adjoins the insertion surface 55a. Particularly the region that is bordered by the skin surface 55b serves to fix the containers 41 or 65 respectively that are to be formed.

The second ring section 56 adjoins the skin surface 55b. The surface section of the second ring section 56 adjoining the cylindrical skin surface 55b has approximately an S-shaped cross-section contour with a first radius R1 and a second radius R2. In a top view onto the inner surface of the ironing rings 54, 76 a concave surface section is formed by the first radius R1 and a convex surface section is formed by the second radius R2. The two radii R1, R2 have a common tangent at the transition location between the concave and the convex surface section, such that the transition from the first radius R1 to the second radius R2 or from the concave to the convex surface section is without steps or edges.

The transition from the first radius R1 or the concave surface section to the skin surface 55b of the first ring section 55 is preferably tangential and thus without steps and edges.

The first radius R1 is preferably smaller than the second radius R2. The first radius R1 is preferably about the factor 2 to 6 smaller than the second radius R2. In the embodiment the first radius is about the factor 4 smaller than the second radius R2.

At the transition from the bottom 42 to the respective side wall 43, 44 the container 41 or 65 that is to be deformed has a third radius R3. The third radius R3 is preferably smaller than the second radius R2 and/or larger than the first radius R1. In the embodiment the third radius R3 can be about the factor 1.2 to 1.6 and for example about the factor 1.4 larger than the first radius R1.

The second radius R2 or the convex surface section respectively transitions into a skin surface 56a of the second ring section 56 that is orientated parallel to working direction A without steps and edges. Each portion of the skin surface 56a of the second ring section 56 is orientated parallel to the portion of the skin surface 55b of the first ring section 55 that is preceding in working direction A.

As in the present embodiment, rectangular containers 41, 65 are formed, the skin surfaces 55b, 56a each form a substantially rectangular ring that is closed around working direction A. The two skin surfaces 55b, 56a are connected with each other, as described, by the concave surface section with the first radius R1 and the convex surface section that adjoins tangentially with the second radius R2 without steps and edges.

The dimensions of the intermediate container 77 in width direction B and in length direction L correspond at the inside as well at the outside to the battery cell container 21 to be manufactured. For providing the dimensional accuracy in height direction H, the intermediate container 77 is transported from the second ironing station 28 along the transport plane T in the separating station 31 according to the example. There the edge 82 adjoining the opening 81 of the intermediate container 77 is separated by means of the separating device 32. A separating line 83 along which the edge 82 is separated is schematically shown in dashed lines in FIG. 13. The separating line 83 is present between the edge section 70 and the rest step 62 or the rest surface 63. The edge 82 can be supplied to a recycling process.

Figure 14:
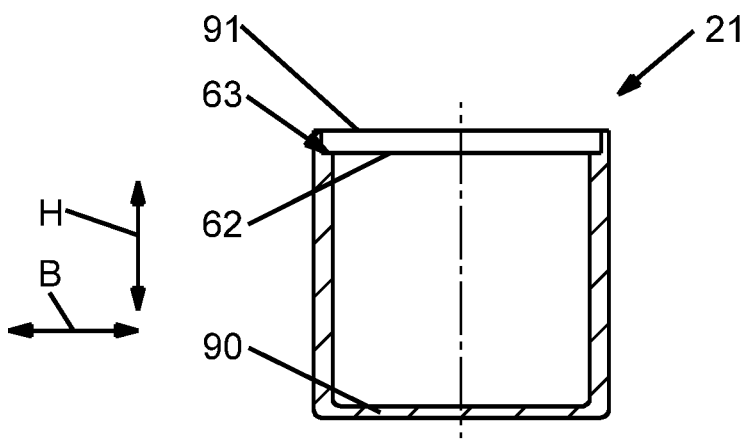

The battery cell container 21 obtained after separating the edge 82 is illustrated in FIGS. 14 and 15. It comprises a bottom 90 that is opposite to an opening 91 of the battery cell container 21. The opening 91 is bordered by four side walls, that is two opposing length side walls 92 and two opposing width side walls 93. The side walls 92, 93 adjoin the bottom 90 and the respective adjacent side wall 93 or 92 respectively without seam or joint location. In height direction H with a distance to the opening 91 the rest surface 63 of the rest step 62 is present and facing toward the opening 91. There a cover for closing the battery cell container 21 can be laid.

The battery cell container 21 has a cuboid shape. The two length side walls 92 or the two width side walls 93 are orientated parallel with each other respectively. The outside of the battery cell container 21 has an outer dimension al in length direction L that is at least about the factor 4 to 5 and for example at least about the factor 7 larger than the outer dimension ab in the width direction B. The outer dimension al of the battery cell container 21 is at most larger by the factor 15 as the outer dimension ab in width direction B. An outer dimension ah of the battery cell container 21 in height direction H can be larger, as large as or smaller than the outer dimension ab in width direction B. According to the example, the outer dimension ah in height direction H is remarkably smaller than the outer dimension al in length direction L.

In the exemplary method the extruded container 41 is provided with a lubricant before the first ironing and/or before the second ironing at least at the outer sides of the side walls 43, 44, in order to optimize the friction between the container and the respective die tool 27, 30. Drawing oil can for example be used as lubricant.

The invention refers to a method and an apparatus 20 for manufacturing of a prismatic unilaterally open battery cell container 21. First an extruded container 41 is formed from a slug 38 by extrusion. The slug 38 consists of a uniform material. The extruded container 41 is then formed by a first ironing in a first ironing station 25 and by a second ironing in a second ironing station 28. During ironing the container is moved by a respective ironing ram 26, 29 only partly through an associated die tool 27, 30 and is reversed when reaching a reversal point U. After the second ironing a remaining edge 82 of the obtained intermediate container 77 is separated, thereby the battery cell container 21 is obtained.

LIST OF REFERENCE NUMBERS

20 Device
21 battery cell container
22 extrusion press station
23 press ram
24 press mold
25 first ironing station
26 first ironing ram
27 first die tool
28 second ironing station
29 second ironing ram
30 second die tool
31 separating station
32 separating device
38 slug
39 inner wall of the mold
40 gap
41 extruded container
42 bottom of the extruded container
43 width side wall of the extruded container
44 length side wall of the extruded container
45 corner region of the extruded container
50 end face of the first ironing ram
51 counter holder
52 supporting surface
53 biasing device
54 first ironing ring
55 first ring section
55a insertion surface
55b skin surface of the first ring section
56 second ring section
56a skin surface of the second ring section
60 protrusion
61 protrusion surface
62 rest step
63 rest surface
65 ironed container
66 bottom of the ironed container
67 length side wall of the ironed container
68 width side wall of the ironed container
69 opening of the ironed container
70 edge section
71 strip device
75 transfer device
76 second ironing ring
77 intermediate container
78 bottom of the intermediate container
79 length side wall of the intermediate container
80 width side wall of the intermediate container
81 opening of the intermediate container
82 edge of the intermediate container
83 separating line
90 bottom of the battery cell container
91 opening of the battery cell container
92 length side wall of the battery cell container
93 width side wall of the battery cell container
α inclination angle
A working direction
ab outer dimension in width direction of the battery cell container
ah outer dimension in height direction of the battery cell container al outer dimension in length direction of the battery cell container
B width direction
dy difference between maximum and minimum width
dz difference between maximum and minimum height
F biasing force
H height direction
L length direction
R retracting direction
R1 first radius
R2 second radius
R3 third radius
sb thickness of the bottom of the extruded container
sw thickness of the side wall of the extruded container
T transport plane
U returning position
x length of the extruded container
y width of the extruded container
ymax maximum width of the extruded container
ymin minimum width of the extruded container
z height of the side walls of the extruded container
zmax maximum height of the side walls of the extruded container
zmin minimum height of the side walls of the extruded container

What is claimed is:

1. Method for manufacturing a unilaterally open prismatic battery cell container (21) comprising the following steps:
    providing a slug (38) having a length that is at least four to five times longer than the width of the slug (38), the slug (38) having a larger cross-section area in two length end regions adjacent to short sides than in a center region between the two length end regions,
    manufacturing a unilaterally open extruded container (41) by extrusion of the slug (38),
    first ironing of the extruded container (41) into an ironed container (65) in a first ironing station (25), wherein the extruded container (41) is partly moved through a first die tool (27) in working direction (A) and out of the first die tool (27) opposite the working direction (A) in a retracting direction (R) by a first ironing ram (26),
    second ironing of the ironed container (65) into an intermediate container (77) in a second ironing station (28), wherein the ironed container (65) is partly moved through a second die tool (30) in working direction (A) and out of the second die tool (30) opposite the working direction (A) in a retracting direction (R) by a second ironing ram (29),
    separating an upper edge (82) of the intermediate container (77) for forming the battery cell container (21).

2. Method according to claim 1,
    characterized in that the extruded container (41) comprises a polygonal bottom (42), the dimension thereof in a direction (L) is at least about a factor 4 to 7 larger than in another direction (B), wherein the two directions (L, B) are orientated rectangular to each other.

3. Method according to claim 2,
    characterized in that the bottom (42) of the extruded container (41) comprises four corner regions (45), two length sides and two width sides.

4. Method according to claim 3,
    characterized in that the extruded container (41) comprises adjacent to each length side of the bottom (42) one length side wall (44) that oppose each other and that camber away from each other.

5. Method according to claim 4,
    characterized in that the distance between the length side walls (44) in the middle between the corner regions (45) is at least 5% to 10% greater than the distance in the corner regions (45).

6. Method according to claim 3,
    characterized in that the extruded container (41) comprises adjacent to each length side of the bottom (42) a length side wall (44) and adjacent to each width side a width side wall (43) and that the upper edge of a length side wall (44) and/or a width side wall (43) has a curved extension, such that the height (z) of the respective side wall (43, 44) increases starting from the corner region toward a middle section.

7. Method according to claim 6,
    characterized in that a maximum height (zmax) of the side wall (43, 44) is 5% to 20% or 7% to 17% larger than a minimum height (zmin).

8. Method according to claim 6,
    characterized in that a thickness (sb) of the bottom (42) of the extruded container (41) is smaller than a wall thickness (sw) of the side walls (43, 44) of the extruded container (41).

9. Method according to claim 7,
    characterized in that a target value for a wall thickness (sw) of the side walls (43, 44) of the extruded container (41) is between 0.5 mm and 1.5 mm or between 0.7 mm and 1.1 mm.

10. Method according to claim 9,
    characterized in that the wall thickness (sw) of the side walls (43, 44) of the extruded container (41) deviates at most by 0.3 mm or at most by 0.1 mm from a pre-determined target value.

11. Method according to claim 1,
    characterized in that lubricant is supplied on the extruded container (41) before the first ironing.

12. Method according to claim 1,
    characterized in that during the first ironing and/or during the second ironing a rest step (62) with a pre-defined height distance (z) from a bottom (66, 78) is formed in side walls of the ironed container (65) and/or the intermediate container (77).

13. Method according to claim 12,
    characterized in that the first ironing ram (26) and/or the second ironing ram (29) comprise a protrusion (60) for forming a rest step (62) that is arranged with the height distance (z) away from an end face (50) of the respective ironing ram (26, 29).

14. Method according to claim 8,
    characterized in that the wall thickness (sw) of the side walls of the extruded container (41) is reduced between 5% and 30% during the first ironing.

15. Method according to claim 14,
    characterized in that the wall thickness (sw) of the side walls of the extruded container (41) is reduced between 10% and 20% during the first ironing.

16. Method according to claim 1,
    characterized in that a wall thickness (sw) of the side walls (67, 68) of the ironed container (65) is reduced by less than 1% during the second ironing.

17. Device (20) for manufacturing a unilaterally open prismatic battery cell container (21), comprising:
- an extrusion press station (22) comprising a press ram (23) and a unilaterally open press mold (24),
- a first ironing station (25), comprising a first ironing ram (26) moveable in a working direction (A) and opposite the working direction (A) in a retracting direction (R) and a first die tool (27),
- a second ironing station (28), comprising a second ironing ram (29) moveable in working direction (A) and in retracting direction (R) and a second die tool (30),
- and a separating station (31), comprising a separating device (32) for separating an edge (82) from an intermediate container (77),
- wherein the device (20) is configured to perform the method according to claim 1.

* * * * *